(12) United States Patent
Deutsch et al.

(10) Patent No.: US 7,016,557 B2
(45) Date of Patent: Mar. 21, 2006

(54) OPTICAL CHIP AND METHOD FOR PRODUCING AN OPTICAL CHIP HAVING A REINFORCED STRUCTURE

(75) Inventors: Bernhard A. Deutsch, Hickory, NC (US); Angela Rief, Munich (DE); Wolfgang Schweiker, Weyarn (DE); Frank Zimmer, Scheurin (DE)

(73) Assignee: Corning Incorporated, Corning, NY (US)

( * ) Notice: Subject to any disclaimer, the term of this patent is extended or adjusted under 35 U.S.C. 154(b) by 211 days.

(21) Appl. No.: 10/380,445

(22) PCT Filed: Sep. 12, 2001

(86) PCT No.: PCT/DE01/03500

§ 371 (c)(1),
(2), (4) Date: Mar. 12, 2003

(87) PCT Pub. No.: WO02/23238

PCT Pub. Date: Mar. 21, 2002

(65) Prior Publication Data

US 2004/0022477 A1 Feb. 5, 2004

(30) Foreign Application Priority Data

Sep. 14, 2000 (DE) .................. 100 45 566

(51) Int. Cl.
*G02B 6/12* (2006.01)
(52) U.S. Cl. ...................................... 385/14
(58) Field of Classification Search ............... 385/14, 385/129–132, 1–8
See application file for complete search history.

(56) References Cited

U.S. PATENT DOCUMENTS

| 5,327,517 A | 7/1994 | Yamada et al. ............. 385/137 |
| 5,371,818 A * | 12/1994 | Presby ........................ 385/49 |
| 5,589,242 A * | 12/1996 | Stief et al. .................... 428/45 |
| 6,408,111 B1 * | 6/2002 | Doerr et al. ................... 385/3 |
| 2003/0146511 A1 * | 8/2003 | Zhao et al. ................. 257/739 |

FOREIGN PATENT DOCUMENTS

| EP | 0484011 A2 | 10/1991 |
| EP | 0678764 A1 | 4/1995 |
| JP | 60080804 A * | 5/1985 |
| WO | WO00/22465 | 4/2000 |

OTHER PUBLICATIONS

"Packaging of Large-scale Planar Lightwave Circuits", Kato, et al 1997 Electronic Components and Technology Conference.

* cited by examiner

*Primary Examiner*—Sarah Song
(74) *Attorney, Agent, or Firm*—Walter M. Douglas

(57) ABSTRACT

The invention relates to an optical chip and to a method for producing an optical chip having a reinforced structure. The chip has a substrate, optical waveguides arranged on the surface of said substrate, and at least one optical structure for influencing the optical properties of the optical waveguides, and an interconnected laminar reinforcing or stiffening structure constructed in the form of a cross which is arranged centrally on the substrate with the provision of diametrically opposite cut-outs.

9 Claims, 3 Drawing Sheets

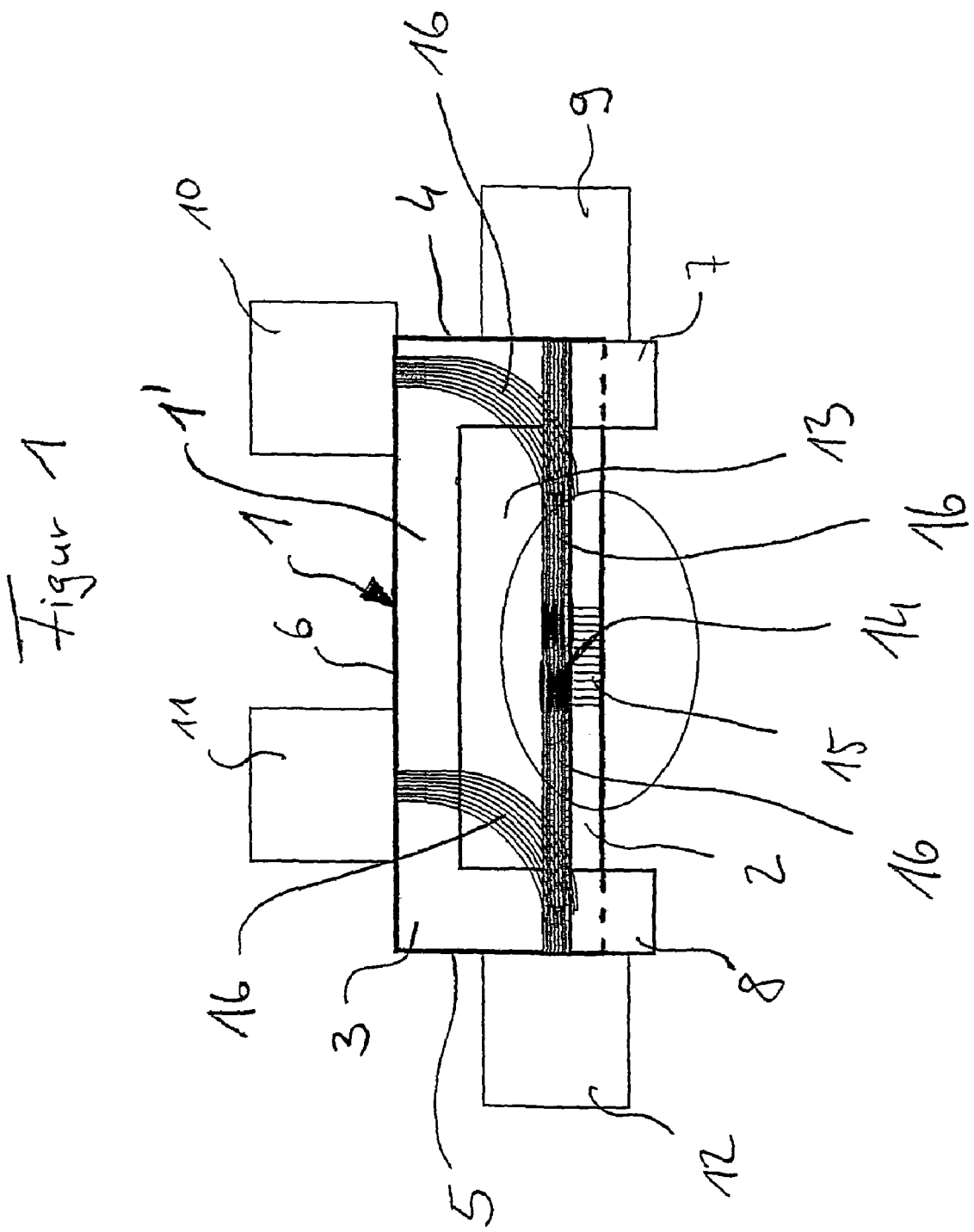
Figur 1

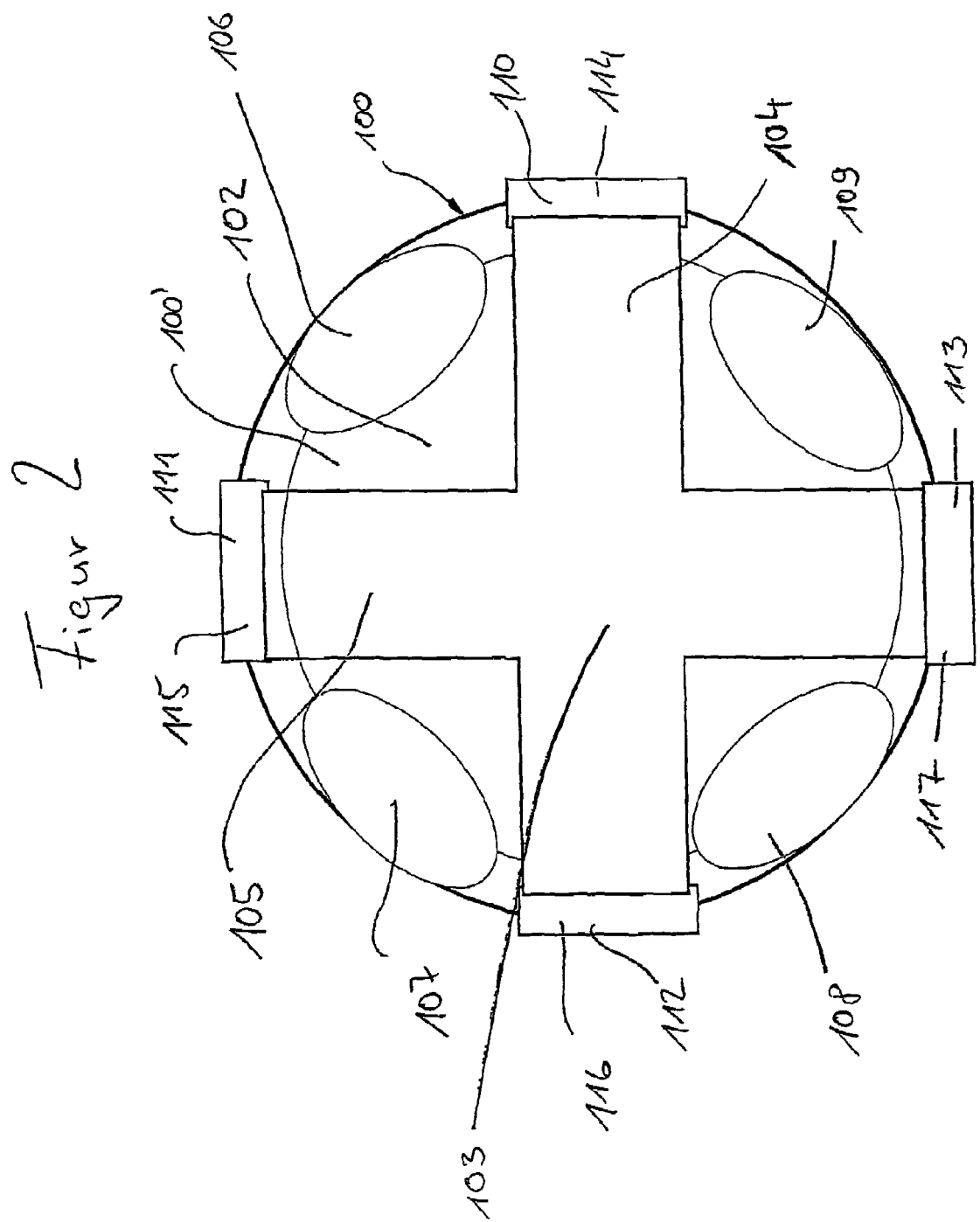

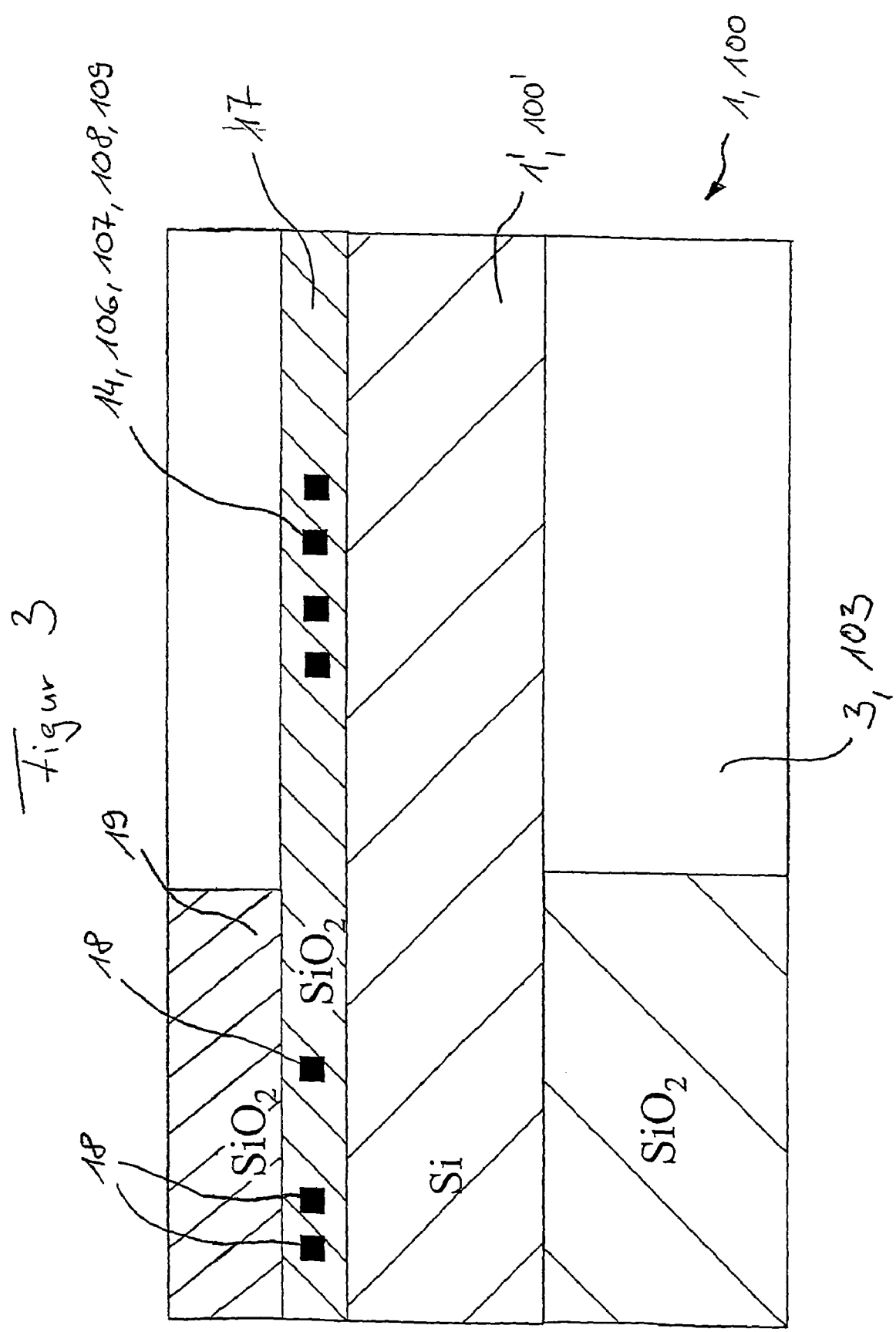

OPTICAL CHIP AND METHOD FOR PRODUCING AN OPTICAL CHIP HAVING A REINFORCED STRUCTURE

FIELD OF THE INVENTION

The invention relates to an optical conductor component in the form of an optical chip to which it is possible to connect optical conductors (LWL), such as, for example, individual fibres or fibre arrays and/or other optical conductor components such as photodetectors or photodetector arrays. The invention further relates to a method for producing such an optical chip.

BACKGROUND OF THE INVENTION

In order to be able to implement an optical coupling between planar LWL components, that is to say optical chips, and assemblies to be connected thereto, it is necessary for the optical chips to be strengthened structurally so that they withstand mechanical loads associated with the connection of optical conductors and other LWL assemblies. For this purpose, the chips are usually constructed in a thickened fashion by providing the entire underside of the respective chip with an additional glass plate which is pressed onto the chip after adhesive material has been interposed. The glass plate stiffens the chip structurally to a sufficient extent such that the latter withstands the mechanical loads to be expected.

Simply pressing the glass sheet onto the chip has, however, the disadvantage that the chip, which has a slightly curved shape because of its customary production process, experiences concave bending and bending back. The latter leads to strains in the chip, and thus to influences exerted on the optical conductors, made from glass, accommodated in the chip, since additional instances of refraction are caused in the optical conductors because of the strains. Furthermore, particularly in the case of optical chips with thermooptical structures, which are necessary, for example, for attenuating or for switching, the glass plate applied over the entire surface of the underside is disadvantageous in thereby worsening the good thermal conduction which is required in the reverse direction owing to the silicon or glass substrate of the chip.

SUMMARY OF THE INVENTION

The invention creates an optical chip, with a thermooptical structure, which has adequate structural strength, and in the case of which there is lessening of the impairments, caused by strength-enhancing components, of its optical, in particular thermooptical properties. Furthermore, the invention creates a method for producing an optical chip with the aid of which the optical chip can be produced with improved optical properties, and yet with an adequate structural strength.

BRIEF DESCRIPTION OF THE DRAWINGS

FIG. 1 shows a schematic illustration of an optical chip according to an embodiment of the invention in a view from below, FIG. 2 shows a schematic illustration of an optical chip according to another embodiment of the invention in a view from below, and FIG. 3 shows a cross section through an optical chip according to an embodiment of the invention.

DETAILED DESCRIPTION OF THE INVENTION

The optical chip has a substrate after an aspect of the invention, on the top side of the substrate arranged fiber-optic cables and at least an thermaloptical structure located on the top side of the substrate for the influence of the optical characteristics of the fiber-optic cables. Furthermore the optical chip exhibits a coherent, layer shaped reinforcement structure, which is appropriate on the lower surface of the substrate in accordance with the invention. The reinforcement structure and the respective thermaloptical structure are in such a manner intended that the reinforcement structure at least partly extends under going around the respective thermaloptical structure in the plan view of the chip seen in a distance from the respective thermaloptical structure crosswise over the substrate and/or along the free edge of the substrate around the respective thermaloptical structure.

The term "cohesive" stiffening structure is understood in this case to mean that the stiffening structure is not provided in a fashion consisting of separate individual elements, but that it extends continuously, that is to say without a break, on the substrate.

Because the thermooptical structures are left free from the stiffening structure, backward heat removal, that is to say downward heat removal, is not prevented below these structures. Consequently, it is possible to set up between the top and undersides of the chip an adequately steep temperature gradient which is essential for effective functioning of the thermooptical structures. An overall improvement in thermooptical properties of the chip is thereby achieved. Although provided as a layer, that is to say in a planar fashion, the stiffening structure has the function of a stiffening rib arrangement with the aid of which an adequate structural strength of the substrate is achieved. The strains in the substrate are reduced on those sections of the substrate which are left free from the stiffening structure, since the stiffening structure in these sections cannot force the substrate directly to adapt to its own shape. An improvement in the optical properties of the chip is achieved thereby. Optical couplings of LWL lines external to the chip and of assemblies can be arranged on the regions of the chip strengthened by the stiffening structure.

After a further aspect of the invention the optical chip has a substrate, on the top side of the substrate arranged fiber-optic cables and at least an optical structure located on the top side of the substrate for the influence of the optical characteristics of the fiber-optic cables. Furthermore the optical chip exhibits a coherent, layer shaped reinforcement structure, which is appropriate on the lower surface of the substrate. The connection between the reinforcement structure and the substrate is without tension intended. According to the embodiment, the stiffening structure is almost excluded from influencing the optical properties of the chip, because the substrate is not necessarily adapted to the shape of the stiffening structure, as a result of which strains would otherwise, as explained above, be produced in the substrate and the optical conductors arranged thereon. The explained stress-free connection between the substrate and stiffening structure is advantageous both in the case of optical structures provided as thermooptical structures, and in the case of the use of other optical structures such as AWG (Arrayed Waveguide Grating) or splitter structures. In the case of the use of non-thermooptical structures on the optical chip, the latter is likewise preferably provided with the stiffening structure not over the entire area but, in particular, with leaving free of the optical structures.

The production of an unstressed connection between substrate and reinforcement structure effected favourable-proves as in the following example.

In accordance with the invention a preferential procedure for manufacturing a structure-strengthened optical chip with a substrate and on its top side arranged fiber-optic cables, with one like described structure planned, is preceding with which a hardenable bonding agent is applied layer shaped on the lower surface of the substrate, a layer shaped reinforcement structure on the bonding agent is in particular presented, and the bonding agent under training an unstressed connection between the reinforcement structure and the substrate without additional mechanical effects on the substrate and the reinforcement structure is hardened. It is to be noted in this case that the adhesive can also the applied in a layered fashion to the underside of the substrate by virtue of the fact that it is applied in a layered fashion to the side of the stiffening structure facing this underside, the stiffening structure then being laid onto the substrate.

Because the stiffening structure is merely laid onto the substrate, and the adhesive introduced between the substrate and the stiffening structure is cured simply without further external mechanical action on the substrate and the stiffening structure, a stress-free connection is achieved between substrate and stiffening structure which is attended by the above named improvements with regard to the optical properties of the chip.

Consideration is given as adhesive to glues, in particular glues by means of which a satisfactory bonding of the stiffening structure on the substrate is achieved without excessive supply of heat.

The chip can be ground and polished at the circumference after the curing of the adhesive and the possible application of additional layers and/or assemblies to be applied to the top side of the substrate.

In the case when thermooptical structures are provided on the optical chip, according to the invention these structures are left free extensively from the stiffening structure, seen in the chip plane. In the case of other optical structures such as the above named splitters and AWG structures, the stiffening structure can admittedly be applied to the entire lower lateral surface of the substrate of the optical chip, because there is no need to form a temperature gradient from top to bottom; however, it is preferably provided likewise only partially, in particular with leaving free of the optical structures, because the optical properties of the chip are thereby improved.

According to an embodiment of the invention, the stiffening structure is constructed with a central cut out in the form of a frame running partially around the edge of the substrate. The stiffening frame thereby achieved and arranged on the circumference of the chip results in a strong stiffening effect which permits the central cut out to be constructed with large dimensions in order for a plurality of different thermooptical structures to be arranged there. This stiffening structure is suitable, in particular, for rectangular chips, the thermooptical structures preferably being arranged along a longitudinal side of the chip.

According to another embodiment of the invention, the stiffening structure is constructed in the form of a cross which is arranged centrally on the substrate with the provision of diametrically opposite cut-outs. This stiffening structure is suitable, in particular for circular chips. The bars of the cross of the stiffening structure preferably extend at least up to the lateral edge of the substrate such that optical lines such as, for example, glass fibres, can be led up to the chip from the side thereof and can be fitted there. The four cut-outs produced are embraced thereby respectively on two sides of the stiffening structure in such a way that the circularly arcuate edge sides of the substrate, which are assigned to the cut-outs, remain free.

In order to prevent strains of the substrate occurring owing to temperature fluctuations during operation, the stiffening structure is advantageously made from a material which has substantially the same coefficient of thermal expansion as the substrate material. Differences of the order of magnitude of $10^{-6}$ are to be understood in this case by "substantially".

Glass is a suitable substrate material. Glass material functions adequately in stiffening and can be connected simply to the substrate, which, for its part, is made either from silicon, or likewise from glass, in particular by being glued. However, other materials with an adequate stiffening function and which can be handled well also come into consideration.

After a further aspect of the invention an optical chip is intended, with a substrate, on the top side of the substrate arranged fiber-optic cables, which are intended in a carrier layer located on the top side of the substrate, at least an thermaloptical structure located on the top side of the substrate for the influence of the optical characteristics of the fiber-optic cables, and one on the top side of the carrier layer trained, layer shaped protection structure, over on the same trained fiber-optic cables at least at the edge sections of the optical chip intended is seen in a distance from the respective thermaloptical structure extended and in the plan view of the chip.

As thereby according to invention the advantage is described above obtained that in the range of the thermaloptical structure a strong temperature gradient can be formed also from above downward by the chip substrate through sloping temperature, whereby the function of the thermaloptical structure is substantially improved. In this case, a protective structure constructed directly above the thermooptical structure, which is likewise preferably provided in the carrier layer, would lead to thermal conduction via direct contact with the carrier layer, such that heat would be conducted away upwards directly from the thermooptical structure, and this would lead to a reduction in the temperature immediately at the thermooptical structure, and thus to a reduction in the temperature gradient downwards. Given that, in accordance with the invention, the thermooptical structure is left free from the protective structure on the top side of the carrier layer, such a direct quick removal of heat does not take place, the heat transfer between the carrier layer and the air surrounding the latter being slight.

After a further aspect of the invention an optical chip is intended, with a substrate, on the top side of the substrate arranged fiber-optic cables, which are intended in a carrier layer located on the top side of the substrate, at least an optical structure located on the top side of the substrate for the influence of the optical characteristics of the fiber-optic cables, and, a layer shaped protection structure trained on the top side of the carrier layer, which are intended over the fiber-optic cables planned on the substrate at least at the edge sections of the optical chip and which is without tension connected with the carrier layer.

The stress-free connection between the carrier layer and the protection structure is made according to the unstressed connection between the reinforcement structure and the substrate, by a bonding agent on the carrier layer or on this turned side of the protection structure layer shaped applied, which is presented protection structure with between-lying bonding agent on the carrier layer and which is hardened bonding agents without practice of external mechanical loads on the chip, for example by supply of warmth. With the unstressed connection between protection structure and carrier layer the same favourable effects are obtained, planned as with the unstressed connection between the substrate and on its lower surface the reinforcement structure.

The respective aspects can as a function of the fact whether the chip with thermaloptical structures or is not provided, or whether a protection structure or a reinforcement structure for necessary is judged, for example as a function of the respective inherent strength of the substrate and/or the extent of the sharpening procedure, as required in arbitrary combination or to be used individually. Preferentially both protection structure and stiffening structure are intended in combination.

The protective structure and the carrier layer are preferably made from a material which has essentially the same coefficient of expansion as the substrate material.

In accordance with the preferred material for the stiffening structure, glass is a preferred material for the protective structure. The protective structure need not be provided cohesively, but can be arranged split up into mutually separate parts only in those regions where grinding and polishing of the optical conductor structures, that is to say the optical conductor, is required in order to prevent them from being damaged, for example in the form of glass chippings. Consequently, the protective structure is provided directly below the optical conductor structures, at least at the edge sections of the chip, since external optical conductor fibres are connected at the edge of the chip to its optical conductor structures, the latter being processed by grinding and polishing the end face of the chip in order to construct optical connecting points on the edge side.

Preferred embodiments of the invention are explained below with reference to the drawing, in which:

FIG. 1 shows a schematic illustration of an optical chip according to an embodiment of the invention in a view from below, FIG. 2 shows a schematic illustration of an optical chip according to another embodiment of the invention in a view from below, and FIG. 3 shows a cross section through an optical chip according to an embodiment of the invention.

The optical chip 1 visible from FIG. 1 has a substrate 1' (illustrated by the thick, rectangular line) in the form of a rectangle with different side lengths. The substrate 1' is provided on its underside 2 with a stiffening structure 3 which extends along the two short edge sides 4, 5 and along one 6 of the two long edge sides (the top edge side in FIG. 1). The stiffening structure 3 thereby forms a U-shaped stiffening frame which runs round along three edge sides 4, 5 and 6, and thereby is a partially embracing frame. At the two longitudinal ends of the chip 1, the two limbs 7, 8 of the frame-shaped stiffening structure 3 thereby project a little, in the direction of the width of said chip, beyond the rectangular substrate 1' thereof (illustrated by the thick line). According to this embodiment, the width of the frame-shaped stiffening structure 3 is just half as large as the width of the substrate 1' of the chip 1. In the case when the chip 1 has larger dimensions or smaller dimensions as regards its length and width, the width of the frame-shaped stiffening structure can therefore be selected to be larger or smaller than the width of the substrate. Provided on the circumference of the chip 1 are four optical connecting points 9, 10, 11, 12 which are respectively arranged at points on the chip 1 where the stiffening structure 3 extends. External optical conductor lines and/or other optical conductor assemblies can be connected to the chip 1 via these optical connecting points 9, 10, 11, 12. The stiffening structure 3 here constructs adequately large and stable connecting points as a result of which it is possible, for example, to bond the external components, such as lines, to the chip 1.

The middle region 13 of the chip 1 is extensively left free from the stiffening structure 3 because the latter runs around partially on the edge side. The chip 1 is provided with a thermooptical structure 14 in this middle region 13 (indicated diagrammatically by an ellipse) whose terminals 15 are provided on the edge side of the free longitudinal side of the chip 1. Very fine lead wires, for example gold wires, are connected to these terminals 15, and so structural strengthening by the stiffening structure 3 is not required in this region.

Furthermore, chip-internal optical conductors in the form of optical conductor structures 16 are arranged on the chip 1 and connect the optical connections 9, 10, 11, 12 to one another and to the thermooptical structure 14.

Illustrated in FIG. 2 is an optical chip 100 according to another embodiment of the invention. This optical chip 100 has a circular substrate 100' (illustrated by the thick line). On its underside 102, the optical chip 100 is provided with a stiffening structure 103 which is structured in the form of a cross arranged centrally on the underside 102 of the substrate 100'. The bars 104, 105 of the cruciform stiffening structure 103 cross one another at an angle of 90° and extend transversely over the chip 1 up to its circumferential edge. The width of the bars 104, 105 of the cruciform stiffening structure 103 is approximately ¼ of the diameter of the chip 100.

Seen in the top view of the chip 100, four areas are left free thereon from the stiffening structure 103 because of the cruciform shape of the stiffening structure 103. In each of these four areas, there is provided on the chip 1 a thermooptical structure 106, 107, 108, 109 by means of which the optical properties of the optical conductors provided on the chip 1, and thus the optical properties of the chip 1, can be set.

Coupling devices 114, 115, 116, 117 for connecting external optical conductor lines and other optical conductor assemblies are provided in each case at the four frontal end sections 110, 111, 112, 113 of the stiffening structure 103. The wide extending stiffening structure 103 here offers sufficient area for fastening the external assemblies on the chip 1 without any problem, for example by means of glueing. The stiffening structure 103 extends at a distance around the thermooptical structures 106, 107, 108, 109 at a spacing which is so wide that heat conduction downwards starting from the respective thermooptical structure 106, 107, 108, 109 is not prevented by an insulating effect of the stiffening structure 103.

A schematic sectional view of an optical chip 1, 100 according to the invention is illustrated in FIG. 3. This sectional view relates both to the optical chi) 1 according to FIG. 1 and to that according to FIG. 2, and so corresponding reference numerals are used for the respectively identical assemblies.

As may be seen from FIG. 3, a substrate 1', 100' of the chip 1, 100 is constructed in the form of a silicon layer. Arranged on the top side of the substrate 1', 100' is a carrier layer in the form of a glass layer 17 (silicon dioxide), which extends over the entire substrate 1', 100' and is of thinner construction than the substrate 1', 100' (approximately ⅒ of the substrate thickness). Embedded in the carrier layer 17 formed by the glass layer are optical conductor structures 18, that is to say optical conductors which likewise consist of glass material. A thermooptical waveguide structure 14, 106, 107, 108, 109 is embedded in the carrier layer 17 of the chip 1, 100 on the right-hand side in FIG. 3.

Arranged on the underside of the substrate 1', 100' of the chip 1, 100 is a stiffening or supportive structure 3, 103 which is constructed in the form of a layer made from silicon dioxide, which has a greater thickness than the substrate 1', 100'. As explained above, the supportive structure 3, 103 does not extend over the entire substrate 1' 100'. Instead of this, with reference to the chip plane, the location of the thermooptical waveguide structure 14, 106, 107, 108, 109 is left free from the stiffening structure 3, 103 arranged on the underside of the substrate 1', 100', that is to say no section of the stiffening structure 3, 103 runs below the thermooptical structure 14, 106, 107, 108, 109. Consequently, heat can be eliminated without hindrance through the substrate 1', 100' in a downward direction (rearward direction) starting from the thermooptical structure 14, 106, 107, 108, 109.

Furthermore, a layered protective structure 19 in the form of several mutually separate glass layers provided as cover plates or cover platelets (only one being illustrated in the section) is arranged on the top side of the glass layer 17 and has a greater thickness than preferably 10× the thickness of, the carrier layer 17 situated therebelow. Seen in the top view of the chip 1, 100, the protective structure 19 extends at a substantial spacing from the thermooptical structures 14, 106, 107, 108, 109. The protective structure 19 can also be provided cohesively. In order to protect the sensitive optical conductor structures 18, it is arranged extending exactly over the latter. In this case, it extends, in particular, at those points at which optical lines such as external glass fibres are led un and connected to the chip 1, 100, in order there to provide protection for the very sensitive glass terminal structures constructed on the chip 1, 100, including from the top side of the chip 1, 100. That is to say, the terminal structures are packed in a sandwich-manner between the stiffening structure 3, 103 and the protective structure 19. Particularly on the end face of the chip 1, 100, the layered protective structure 19 arranged on the carrier layer 17 forms a protection for the optical conductors 18 arranged beneath it, since in the event of grinding and polishing processes required on the end face, it prevents glass breakages at the sensitive waveguide structures. In accordance with the production methods according to the invention, it is provided, like the stiffening structure 3, 103, as well, with an adhesive on its side facing the substrate 1' 100' and is laid onto the glass layer 17. The adhesive is subsequently allowed to cure without, apart from the weight force, the exertion of an additional external mechanical load on the glass layer 19 or another part of the chip 1, 100. The fact that the glass layer extends around the thermooptical structures provided, if appropriate, on the chip 1, 100, prevents the undesired upward heat elimination (because of the build up of as steep a temperature gradient as possible with temperature dropping in the direction from tog to bottom) from being strengthened by direct thermal conduction, starting from the thermooptical structures 14, 106, 107, 108, 109, through a further layer arranged directly over said layers on the carrier layer 17. However, in the case of the use of non-thermooptical structures the protective structure 19 can also extend over the latter.

The invention claimed is:

1. An optical chip having a substrate, optical conductors arranged on the top side of the substrate, at least one thermooptical structure, arranged on the top side of the substrate, for the purpose of influencing the optical properties of the optical conductors, and a cohesive, layered stiffening structure provided on the underside of the substrate, the stiffening structure and the respective thermooptical structure being provided in such a way that, seen in the top view of the chip, the stiffening structure extends in two directions perpendicular to each other at a distance from the respective thermooptical structure transversely over the substrate and/or along the free edge of the substrate, at least partially around the respective thermooptical structure, wherein said stiffening structure is constructed in the form of a cross which is arranged centrally on the substrate with the provision of diametrically opposite cut-outs.

2. The optical chip according to claim 1, in which the stiffening structure is constructed with a central cut-out in the form of a frame running partially around the edge of the substrate.

3. The optical chip according to claim 1, the stiffening structure being connected to the substrate in a fashion free of stress.

4. The optical chip according to claim 1, in which the stiffening structure is made from a material which has substantially the same coefficient of expansion as the substrate material.

5. The optical chip according to claim 1, in which the stiffening structure is made from a glass material.

6. The optical chip according to claim 1, in which the optical conductors are provided in a carrier layer arranged on the top side of the substrate and in which a layered protective structure is formed on the top side of the carrier layer and is provided over the optical conductors at least at the edge sections of the optical chip, and, seen in the top view of the chip, extends at a distance from the respective thermooptical structure.

7. The optical chip according to claim 6, in which the layered protective structure is connected to the carrier layer in a fashion free of stress.

8. The optical chip according to claim 7, in which the layered protective structure and the carrier layer are made from a material which has essentially the same coefficient of expansion as the substrate material.

9. The optical chip according to o claim 8, in which the layered protective structure is a glass layer.

* * * * *